(12) United States Patent
Shan et al.

(10) Patent No.: US 7,593,040 B2
(45) Date of Patent: Sep. 22, 2009

(54) IMAGE ANTI-SHAKE IN DIGITAL CAMERAS

(75) Inventors: Jizhang Shan, Cupertino, CA (US); Jess Jan Young Lee, Menlo Park, CA (US); Guansong Liu, Sunnyvale, CA (US); Hui Pan, San Jose, CA (US); Daniel L. Flamm, Walnut Creek, CA (US)

(73) Assignee: Omnivision Technologies, Inc., Santa Clara, CA (US)

( * ) Notice: Subject to any disclaimer, the term of this patent is extended or adjusted under 35 U.S.C. 154(b) by 531 days.

(21) Appl. No.: 11/395,282

(22) Filed: Mar. 31, 2006

(65) Prior Publication Data

US 2007/0177021 A1 Aug. 2, 2007

Related U.S. Application Data

(60) Provisional application No. 60/763,516, filed on Jan. 30, 2006.

(51) Int. Cl.
*H04N 5/228* (2006.01)
*G03B 17/00* (2006.01)

(52) U.S. Cl. .............................. 348/208.99; 348/208.1; 348/208.4; 348/208.6; 348/208.12; 396/52; 396/54; 396/55

(58) Field of Classification Search ............ 348/208.99, 348/252, 208.1–208.12; 396/52–55
See application file for complete search history.

(56) References Cited

U.S. PATENT DOCUMENTS

| | | | |
|---|---|---|---|
| 5,416,558 A | 5/1995 | Katayama et al. | |
| 5,640,277 A | 6/1997 | Ohshita | |
| 5,712,474 A | 1/1998 | Naneda | |
| 5,740,473 A | 4/1998 | Tanaka et al. | |
| 5,790,490 A | 8/1998 | Satoh et al. | |
| 5,890,018 A | 3/1999 | Terui | |
| 5,930,532 A | 7/1999 | Matsumoto | |
| 6,464,363 B1 | 10/2002 | Nishioka et al. | |
| 6,487,369 B1 | 11/2002 | Sato | |
| 6,630,950 B1 | 10/2003 | Ohkawara et al. | |
| 6,687,458 B2 | 2/2004 | Masuda | |
| 6,778,768 B2 | 8/2004 | Ohkawara et al. | |
| 6,982,746 B1 | 1/2006 | Kawahara | |
| 2003/0142218 A1* | 7/2003 | Yamazaki | 348/208.6 |
| 2003/0170024 A1 | 9/2003 | Nishioka et al. | |
| 2003/0174772 A1 | 9/2003 | Voronov et al. | |
| 2003/0193610 A1 | 10/2003 | Nozaki et al. | |
| 2004/0047625 A1 | 3/2004 | Ito et al. | |
| 2004/0174436 A1 | 9/2004 | Miyahara et al. | |
| 2004/0189814 A1 | 9/2004 | Katoh et al. | |
| 2004/0239795 A1 | 12/2004 | Kitajima et al. | |
| 2004/0246593 A1 | 12/2004 | Yamada et al. | |
| 2005/0012822 A1 | 1/2005 | Takeda et al. | |
| 2005/0031326 A1 | 2/2005 | Yamazaki | |
| 2005/0088756 A1 | 4/2005 | Yamada | |

(Continued)

FOREIGN PATENT DOCUMENTS

EP 0 860 685 8/1998

(Continued)

*Primary Examiner*—Jason Chan
*Assistant Examiner*—Michael Osinski
(74) *Attorney, Agent, or Firm*—Blakely Sokoloff Taylor & Zafman LLP

(57) ABSTRACT

A method and system for minimizing the effects of image motion in still cameras is provided. In one embodiment, a method of capturing an image in a digital camera is presented. The method includes calculating a sharpness value related to an image input. The method also includes evaluating the sharpness value to determine image motion. The method further includes capturing a next image input data from the image input responsive to evaluating the sharpness value.

26 Claims, 8 Drawing Sheets

U.S. PATENT DOCUMENTS

| | | |
|---|---|---|
| 2005/0168584 A1 | 8/2005 | Uenaka |
| 2005/0168585 A1 | 8/2005 | Uenaka et al. |
| 2005/0168586 A1 | 8/2005 | Tsubusaki |
| 2005/0169619 A1 | 8/2005 | Uenaka et al. |
| 2005/0190267 A1 | 9/2005 | Uenaka et al. |
| 2005/0190268 A1 | 9/2005 | Uenaka |
| 2005/0195286 A1 | 9/2005 | Uenaka et al. |
| 2005/0195287 A1 | 9/2005 | Uenaka |
| 2005/0195288 A1 | 9/2005 | Uenaka |
| 2005/0196160 A1 | 9/2005 | Uenaka |
| 2005/0200712 A1 | 9/2005 | Uenaka |
| 2005/0206735 A1 | 9/2005 | Seo |
| 2005/0219374 A1 | 10/2005 | Uenaka |
| 2005/0219666 A1* | 10/2005 | Ejima et al. ............... 358/539 |
| 2005/0231603 A1* | 10/2005 | Poon ..................... 348/208.99 |
| 2005/0232617 A1 | 10/2005 | Uenaka et al. |
| 2005/0244152 A1 | 11/2005 | Seo |
| 2005/0254137 A1 | 11/2005 | Yamada et al. |
| 2005/0264656 A1 | 12/2005 | Seo et al. |
| 2005/0265704 A1 | 12/2005 | Uenaka et al. |
| 2005/0270379 A1 | 12/2005 | Seo |
| 2005/0280733 A1 | 12/2005 | Imaizumi |
| 2005/0285949 A1 | 12/2005 | Ogawa et al. |
| 2005/0286388 A1 | 12/2005 | Ayres et al. |
| 2005/0286589 A1 | 12/2005 | Guenter |
| 2005/0286887 A1 | 12/2005 | Uenaka et al. |
| 2006/0140604 A1* | 6/2006 | Suda ........................... 396/55 |

FOREIGN PATENT DOCUMENTS

| | | |
|---|---|---|
| EP | 1 566 962 | 5/2005 |
| JP | 08 320511 A | 12/1996 |

* cited by examiner

IMAGE ANTI-SHAKE IN DIGITAL CAMERAS

CROSS-REFERENCE TO RELATED APPLICATION(S)

The present application is related to U.S. Provisional Patent Application Ser. No. 60/763,516 filed on Jan. 30, 2006, priority to which is claimed.

BACKGROUND

Image shake is an issue that degrades performance in digital cameras. Image shake often results from movement by the user of the camera, or from vibrations transmitted through a mounting such as a tripod or bracket. Another source of image shake is from motion of the object to be imaged. As sensors become smaller, while even increasing the numbers of pixels in the image sensor, image shake becomes a larger issue.

One approach to avoid image shake is to build in a gyroscopic mount for a sensor array. Thus, the sensor array is kept still even when surrounding parts of a camera are in motion. However, this is relatively costly. Also, compensating for camera motion does not reduce adverse effects of movement of the object to be imaged.

While one may expect that a camera is always moving somewhat, the motion of a camera manifesting as image shake may vary during the process of taking a picture. Similarly, the motion of an object can vary, for example when a basketball player jumps or executes an abrupt transient motion. Thus, it may be useful to provide a method and system which takes advantage of times of low motion. Additionally, a low-cost solution for minimizing the effects of image shake can be useful.

BRIEF DESCRIPTION OF THE DRAWINGS

The present invention is illustrated in an exemplary manner by the accompanying drawings. The drawings should be understood as exemplary rather than limiting, as the scope of the invention is defined by the claims.

DETAILED DESCRIPTION

Figure 1:
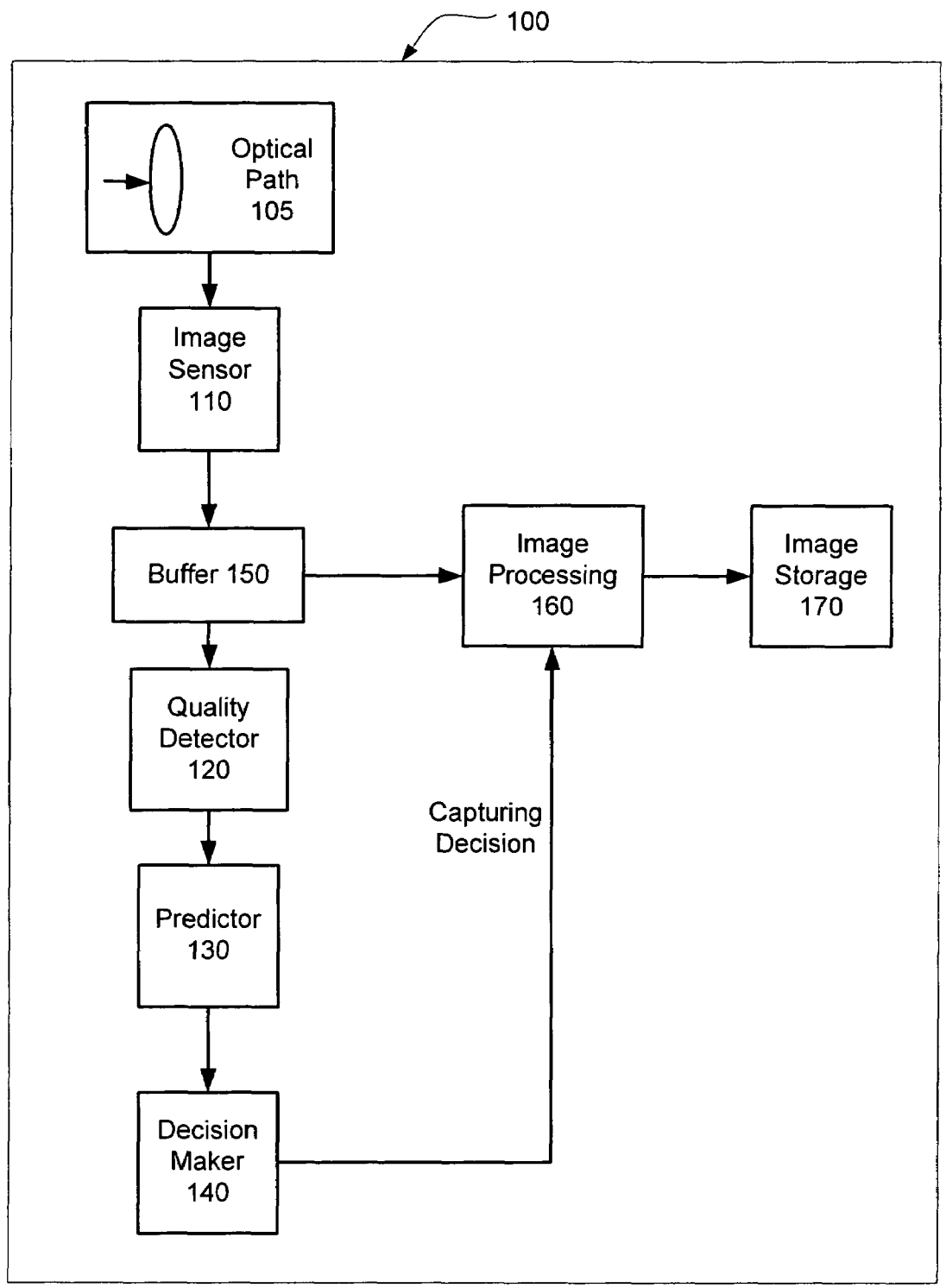
FIG. 1 illustrates an embodiment of a system for reducing the effects of image motion in a digital camera.

A system, method and apparatus are provided for image anti-shake in digital still cameras. The specific embodiments described in this document represent exemplary instances of the present invention, and are illustrative in nature rather than restrictive.

In one embodiment, a method of capturing an image in a digital camera is presented. The method includes calculating a sharpness value based on an image input. In the embodiment, calculating the sharpness value comprises determining a high frequency value related to the image input. The method also includes predicting the quality of a next image based on the sharpness value. The method further includes deciding whether to capture a next image input data responsive to the prediction.

In another embodiment, a digital camera is presented. The camera includes a processor. The camera also includes media for image storage coupled to the processor. The camera further includes an image sensor coupled to the processor. Also, the camera includes an image quality detector for detecting image motion. The image quality detector includes a sharpness detector based on high pass filtering of image data from the digital image sensor. Moreover, the camera includes a predictor of next image motion coupled to the quality detector. Furthermore, the camera includes a decision maker coupled to the predictor. The predictor and decision maker are to evaluate output of the quality detector and capture an image from the digital image sensor in the media, responsive to the output of the quality detector. The quality detector, the predictor and the decision maker can be implemented by the processor in some embodiments.

In another embodiment, an apparatus is presented. The apparatus includes means for calculating a sharpness value related to a current image input. The apparatus also includes means for estimating next image quality depending on the sharpness value. The apparatus further includes means for capturing a next image input data frame from the image input. The means for capturing operates responsive to the means for estimating next image quality.

A method and apparatus as described and illustrated can improve image quality in digital still cameras. The method and apparatus depend on evaluating motion characteristics of image input data, and then capturing the next image sensed. Thus, when a process determines that criteria for relatively stable pictures are met, the process can then capture the next image with the expectation that the next image will be relatively stable. This allows for rapid evaluation, without the need to store multiple images. It also reduces cost associated with expensive components such a movable image sensors and lenses, for example.

In the following description, for purposes of explanation, numerous specific details are set forth in order to provide a thorough understanding of the invention. It will be apparent, however, to one skilled in the art, that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Various embodiments may be further understood from the Figures. FIG. 1 illustrates an embodiment of a system for reducing the effects of image motion in a digital camera. System 100 includes optical components 105 that project an image onto an image sensor 110. The image sensor may be a CCD, CMOS or similar image sensor matrix array. In many embodiments the array is a rectangular array of detectors arranged in rows and columns. Pixels of the image sensor 110 are exposed according to a rolling shutter timing mechanism which is well known in the art. In the illustrative embodiment, a first row of pixels is selected and the image data from individual pixels in the selected row are output sequentially from the image sensor into a line buffer 150. Next, a following row is copied from the image output to the line buffer in the same manner. At the end of each complete scan of the entire image sensor array, a blanking period of predetermined time occurs before the raster scan is repeated. The set of image data of a complete scan from each and every pixel in the image sensor 110 is termed a frame. It is seen that the image sensor is operable to output image data responsive to the projected image.

It will be apparent to those skilled in the art that the referring to a line of sensors in the image sensor as a row or column is somewhat arbitrary. Although the term row often references a line of pixels parallel to the top and bottom of a digital camera, the invention does not depend on any specific designation and a columnwise raster scan can also be performed within the scope and spirit of the invention.

Also, various other methods of partitioning the image sensor and outputting data from the image sensor are useful in some embodiments. For example an artificial frame consisting of selected submatrices of image sensor pixel data can be repeatedly scanned in a selected order. Also, a sensor comprising a pixel addressable image buffer is operable to implement aspects of the invention.

It is known that the quality of digital images is adversely affected by image shake (also referred to herein as image motion) while the image is exposed. Unintentional camera motion causes image shake and results in decreased sharpness. However image motion can also arise from motion of the subject or object being imaged. Relative changes in the sharpness of successive image frames depends on motion characteristics. Generally, the sharpness of an image is greater when there is less motion. It has been discovered that image motion can be effectively predicted based on relative change in the sharpness of subframes. The invention includes an efficient camera anti-shake method that includes evaluating relative sharpness changes based on the subframes, and predicting the sharpness of a next image based on the relative changes. In another aspect of the invention, the camera anti-shake method is operable to reduce the adverse effects of subject motion on image quality. In still another aspect of the invention, an anti-shake digital camera using the anti-shake method is disclosed. The digital camera is easily implemented with modest hardware resources, resulting in relatively low cost.

An embodiment of a method and system for improving image quality in digital cameras according to the present invention is explained further with reference to FIG. 1. The system 100 includes an image sensor 110 that forms image data responsive to an image from the optical path 105. Although the image is of visible light in this embodiment, other embodiments comprise imaging other forms of electromagnetic radiation such as infrared, x-rays, millimeter waves, and so forth. The system 100 further includes machine readable media operable to store instructions and data, and at least one processor operable to perform the instructions and operate on the data. The system also includes an image quality detector 120 that senses image motion based on image data input from the image sensor 110.

In the embodiment, data input from the image sensor 110 is moved into a buffer 150 of machine readable media. The buffer is coupled to the image quality detector 120. In many embodiments, the quality detector 120 comprises a sharpness detector. The system 100 also includes a motion predictor 130 and a decision maker 140. Instructions and data in the computer readable media are operable by the processor to implement the sharpness detector 120, the predictor 130, and the decision maker 140. However in various other embodiments, functionality of the detector, predictor or decision maker, in whole or in part, can be implemented with control circuits. In the embodiment, the media comprises line buffers operable for storing a number of lines of image data corresponding to rows of the pixel data input from the image sensor 110. While lines of image data in the embodiment are rows of data, lines which are columns of pixel data can equivalently be used in various embodiments. Also, detectors comprising non-rectangular pixel configurations and/or other methods operable to receive an image input from an image sensor and store the data in the machine readable media are operable to practice the invention.

In an embodiment of the system shown in FIG. 1, the image sensor 110 is an XGA resolution sensor which has 768 rows comprising 1024 pixels in each row. Hence each full image frame of the sensor comprises 1024×768 pixels. However an image frame comprising a subset of pixel data that is from the sensor is often selected for processing. For example, a smaller array of pixels containing the subject of interest can be selected, thus avoiding the overhead associated with processing and storing unwanted background from the image input (in some embodiments this is termed "digital zoom").

Figure 2:
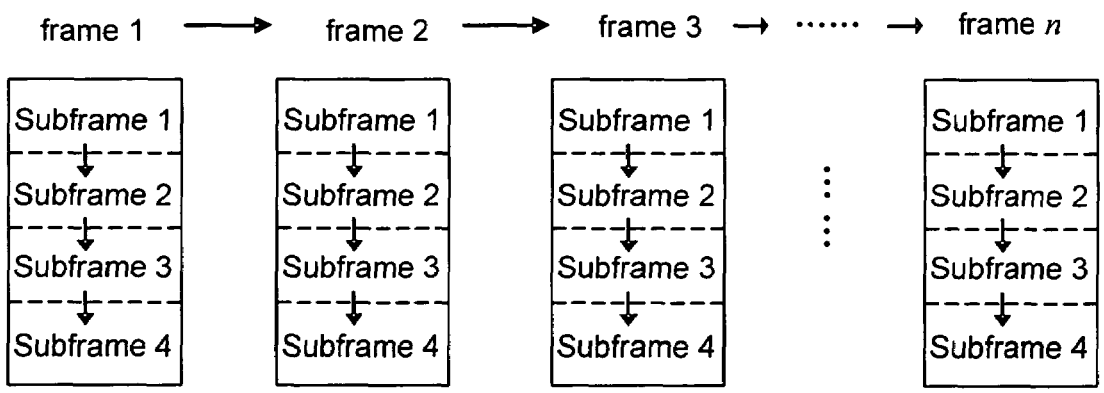
FIG. 2 illustrates a subdivision of sequential image frames into sequential subframes of the image frames.

It has been found that subdividing the image frame into subframes often improves sensitivity for detecting motion. In an embodiment shown in FIG. 2, an image frame is divided into four row-wise subframes. Each of the subframes is W pixels wide and H pixels high. Where the image frame is an XGA array, the value of W, which is the number of horizontal pixels or columns in a row, is 1024. H is the number of pixel rows of the image frame divided by the number of subframes. Therefore the value of H in the embodiment is 256. Of course in other embodiments, for example, where the image frames are selected to have a subset of pixels available from the XGA sensor, the image frame will have other resolutions and can be subdivided into a different number of subframes, depending on the application. Accordingly, W and H depend on the selected resolution and the selected number of subframes.

In many embodiments, the frame image acquisition rate is 15 or 30 frames per second, responsive to a number of design constraints and industry standards. The corresponding image frame exposure times will be somewhat less than $\frac{1}{15}$ s or $\frac{1}{30}$ s since the frame rate usually includes a blanking period between exposures.

In many embodiments, the successively numbered lines of an image frame are exposed sequentially. As the frame rate decreases, an image frame must be divided into more subframes in order to effectively sample relative motion of the image. On the other hand, if the number of subframes is too high, the reduced height of each subframe can introduce an artificial sensitivity to motion in the vertical direction. Hence it is seen that there is a tradeoff between the image acquisition rate and the number of image subframes. It has been found that using at least four equal horizontal subframes provides effective motion sensing in embodiments having VGA (640× 480) or XGA image frame resolution and standard 15 $s^{-1}$ and 30 $s^{-1}$ frame rates.

In one embodiment illustrated in FIG. 1, the sharpness detector 110 detects a sharpness based on the spatial high frequency content of image data. When images of objects have sharper edges (e.g. the objects are not blurred by camera shaking or transient subject movement), they tend to have more high frequency content. Images of the same object with motion tend to have less high frequency content (e.g. motion blur characteristically reduces edge definition). In general, increased spatial high frequency content in an image correlates with sharpness. Therefore a high frequency extracting filter is useful for detecting the sharpness of an image. However other methods of detecting sharpness, or conversely measures of the absence of sharpness, are also useful to sense image motion, depending on the application.

Figure 3:
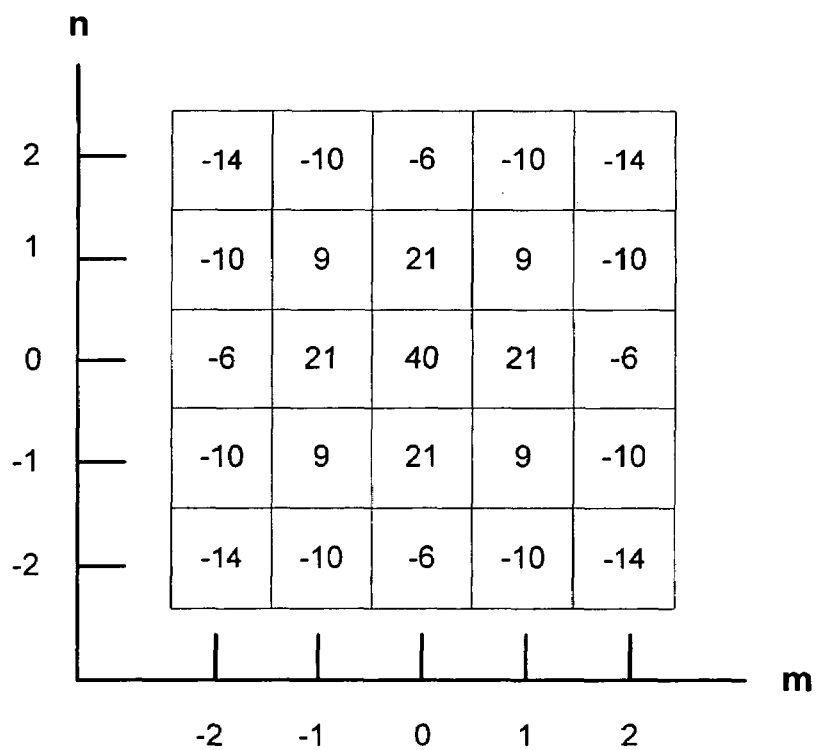
FIG. 3 illustrates a 5×5 matrix of high pass filtering coefficients.

In the embodiment, a sharpness detector comprises high pass filtering. A suitable high pass filter comprises convolving the example 5×5 high pass filter matrix in FIG. 3 with image data f(x,y) to extract high frequency values g(x,y) of the image data. This filter is applied by evaluating the convolution sum:

$$g(x, y) = \sum_{m=-2}^{2} \sum_{n=-2}^{2} w(m, n) f(x+m, y+n),$$

where w(m,n) is an element of the high pass filter matrix shown in FIG. 3. The center of the matrix (m=0,n=0) is positioned is at (x,y). Although the high pass filter matrix comprises 25 values, it can be efficiently stored in only 6 storage cells owing to the 4-fold symmetry: w(m,n)=w(−m,n)=w(m,−n)=w(−m,−n). The high pass filter matrix shown in FIG. 3 is merely one example of a useful filter for extracting a high frequency portion of the image data. Matrices having a symmetry are particularly effective. Other high frequency extracting filters such as single bandpass filters or multiple bandpass filters in combination, and the like, are also useful in some embodiments, depending on the application.

The sharpness detector embodiment forms a subframe sharpness value for the $i^{th}$ subframe in the $j^{th}$ frame comprised of the subframe average high frequency portion given by the following relationship:

$$s_{ij} = \frac{\sum_{x=1}^{W} \sum_{y=1}^{H} |g_{ij}(x, y)|}{W \times H},$$

where W is the number of pixels along the width of the subframe (which is a row of the frame in this embodiment), and H is the number of pixels in a column of the subframe (which is a subframe portion of the full frame column height).

The predictor 130 estimates the expected image motion of a next frame based on the current subframe sharpness value of the current frame and previous subframe sharpness values of previous image frames. An illustrative predictor method in an embodiment that divides an image frame into four subframes operates as follows. The difference between the $i^{th}$ subframe sharpness value in the current $j^{th}$ frame and the corresponding subframe sharpness value, determined for the previous $(j-1)^{th}$ frame is computed according to:

$$D_{ij} = s_{ij} - s_{i,j-1},$$

where i is the current subframe number (i=1,2,3,4). Note that subframes of different frames are said to be corresponding subframes if and only if they have same subframe number. Also, $D_{max}$, the maximum absolute value of the previous consecutive subframe sharpness value differences $D_{ij}$ following the capture command, is found according to:

$$D_{max} = \max(|D_{ij}|),$$

where the subscript i ranges over subframe numbers (i=1,2,3,4) and the subscript j ranges over image frame numbers from the first image frame following the capture command to the current image frame.

The predictor 130 estimates an image motion of the next image frame based on evaluating the two propositions:

$$D_{4j} > 0 \text{ and } D_{4j} < k_1 * D_{max} \text{ and } D_{4j} > D_{3j} \qquad \text{Proposition 1}$$

$$D_{4j} < 0 \text{ and } |D_{4j}| < k_2 * D_{max} \text{ and } D_{4j} > D_{3j} \qquad \text{Proposition 2}$$

where $k_1$ and $k_2$ are selected factors. If at least one of these two propositions is true, a prediction that next frame image motion will be less than the current image frame motion is output to the decision module 140. Otherwise a prediction that the next frame image motion will be equal or greater than the current image frame motion is output to the decision maker. In practice, selecting a constant of ⅔ for $k_1$ and a constant of ½ for $k_2$ has been found to be quite effective. Other selections of $k_1$ and $k_2$ are operable, although it has been found that selecting values of $k_1$ and $k_2$ less than 1 is preferable.

The most recent subframe image data of a frame are considered to provide more accurate estimates of future motion than older data. Therefore Proposition 1 and Proposition 2 in the embodiment are based on $D_{4j}$ since the data of subframe 4 are the last and most recent portion of image frame data input from the image sensor. However other methods of estimating motion based on the sharpness of the image frame data can be selected in various embodiments, and other predictors of future image motion can be used within the scope and spirit of the present invention.

In an embodiment of the method and apparatus illustrated in FIG. 1, the decision module 140 calculates a frame sharpness, $S_j$, of current frame j. The frame sharpness $S_j$ of the current frame (j) is evaluated using the relationship:

$$S_j = \sum_{i=1}^{4} s_{ij}.$$

However other metrics of the frame sharpness based on other relationships are also operable, depending on the embodiment.

The decision maker 140 decides whether or not to capture a next frame from the image sensor 110 and save it in an image storage 170. It will make a decision to capture when all of the following three propositions are true: 1) a capture command was received, 2) the predictor predicts that the next frame will have increased sharpness, and 3) $S_j > S_c$ (e.g. the current frame is sharper than the first image frame received after the capture command).

In practice, image capture must be completed within a limited time after a capture command to be acceptable. It is possible that malfunction or unusual image conditions could lead to an unacceptable delay before the predictor predicts increased sharpness or $S_j > S_c$. To prevent unacceptable delay, the decision maker 140 in FIG. 1 includes a timeout override for capturing the next image frame from the data sensor 110 through the buffer 150 and into image storage 170. Where a capture command was received and the next frame count is about to exceed a predetermined maximum number of image data frames ("Max" in decision step 470 of FIG. 4A), the decision maker 140 decides to timeout and instructs a processor to perform image processing 160 and capture the next image frame from the image sensor 110 into image storage 170, corresponding to stepping through 460, 465, 470, and 480 in FIG. 4A.

Alternatively, where the decision maker 140 does not decide to capture a next image, another subframe of pixels is read from the image sensor 110 and processed by the quality detector 120 and the predictor 130. Of course the scope and spirit of the present invention includes embodiments comprising other methods and/or algorithms for deciding whether to capture a next image based on an output of the predictor and the number of frames and/or time elapsed after a capture command.

Figure 4A:
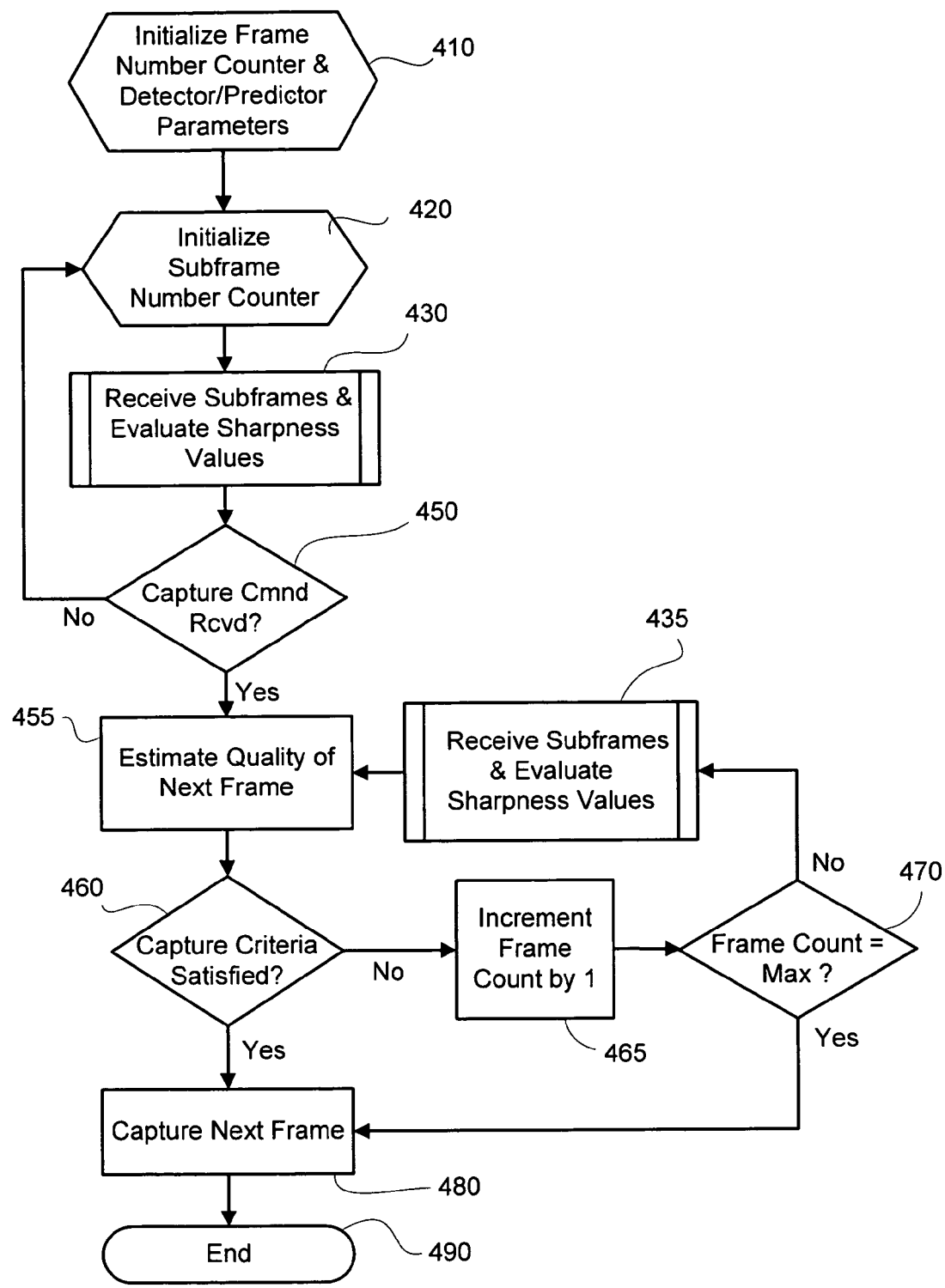
FIG. 4A is a flow diagram showing selected steps of an embodiment for improved image capture.
Figure 4B:
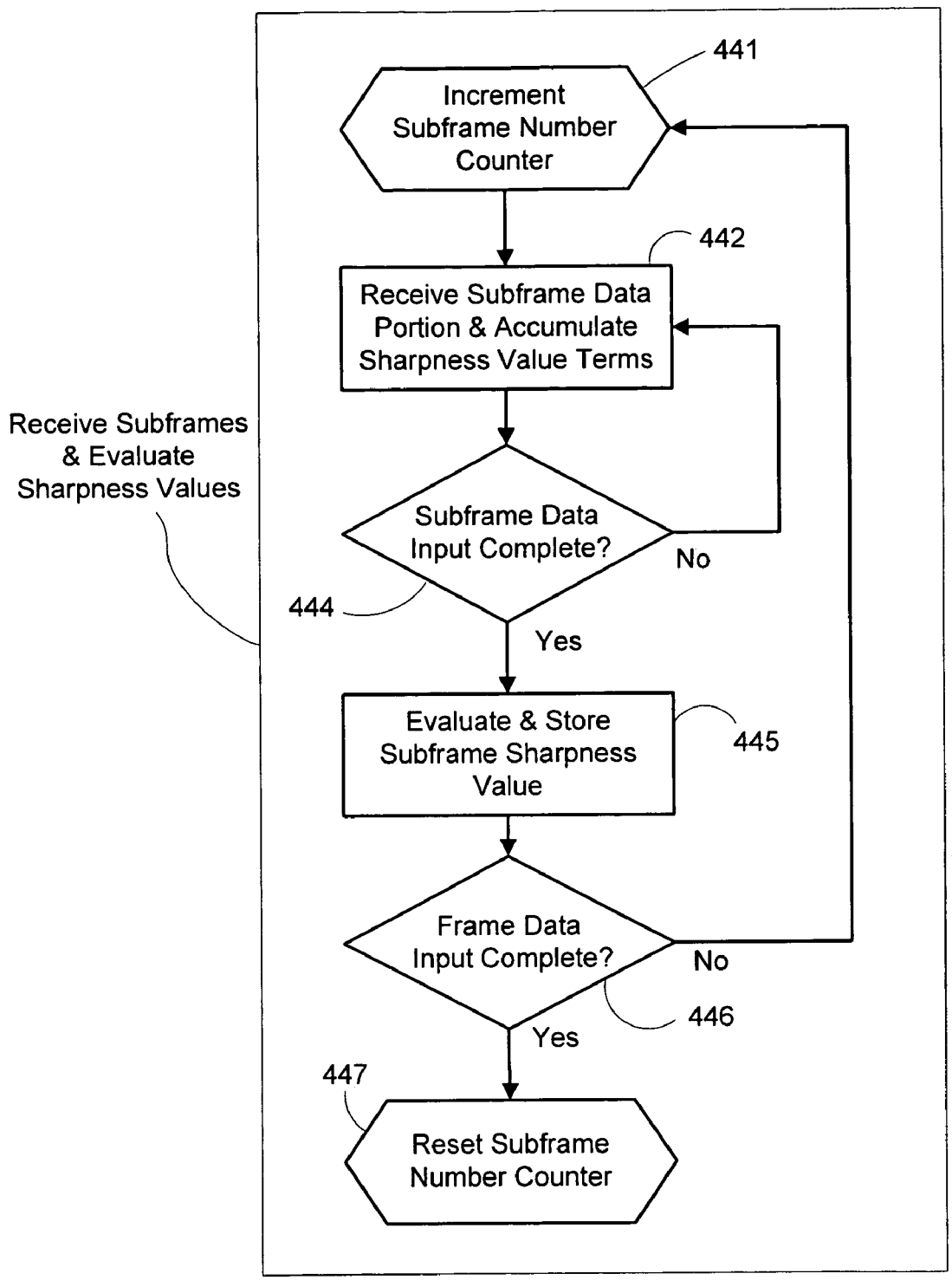
FIG. 4B is a flow diagram showing some further details of selected steps of the embodiment in FIG. 4A.

FIGS. 4A and 4B show further details of an embodiment for image evaluation and capturing. First, registers used to retain the quality detector and predictor parameters and variables (e.g. $D_{max}, S_c, s_{ij}, D_{ij}$ etc.) and the frame number counter are initialized at box 410. Next, a subframe number counter is initialized at box 420. The number of frames that are received depends on the cumulative total number of subframes that are received. In some embodiments counting functions are combined. Also, the counting comprising incrementing the frame counter 461, testing the frame counter 470, incrementing the subframe number 441 and resetting the subframe number 447 may be implemented in other ways including ways having fewer steps.

As merely one example, another embodiment comprising the method of FIGS. 4A and 4B, maintains a count of the cumulative total number of subframes. In the example above, the cumulative total number of subframes comprises the subframe number (the subframe number is equal to the cumulative total subframe number modulo 4), and the frame number (the frame number is integer part of the quotient of cumulative total subframe count divided by 4).

Next, a frame is acquired at box 430, subframe by subframe 442 as sharpness values of the subframes, sharpness value differences, and $D_{max}$ are evaluated and stored in registers 445. In some embodiments, the sharpness values are evaluated according to the relationships set forth above. However, within the scope and spirit of the invention, various other methods and measures of sharpness can be used for evaluating the quality of an image, including other measures depending on filtering a high frequency portion of the image.

Each of the blocks 430 and 435 of FIG. 4A comprises the steps enumerated in blocks 441 through 447 of FIG. 4B. First, the subframe number is incremented 441, a portion of subframe data is read from the image sensor 442, and terms depending on the subframe data are evaluated 442. Additional portions of the subframe are read and evaluated 442-444 until the processing of subframe is complete 445, and sharpness values characteristic of the subframe are evaluated and stored in processor readable media. These steps 441, 442, 444, 445 are repeated until the complete frame has been processed at block 446. After the complete frame is processed, the subframe number is reset 447.

After a frame is read and evaluated at 430, another frame is acquired and evaluated until a capture command is received 450. After the capture command is received, the predictor estimates the quality of the next frame 455 and evaluates capture criteria based on the estimated quality 460. If the capture criteria based on the estimated quality are met, the decision maker commands the capture of a next frame into an image memory 480 and the process ends 490. However, if the capture criteria based on the estimated quality are not met 460, the frame counter is incremented 465 and the decision maker tests whether the frame count has reached the predetermined maximum number "Max" 470. If the frame counter has reached Max, the decision maker commands the capture of a next frame into an image memory 480 and the process ends at block 490. Otherwise at block 435 another frame is acquired and evaluated.

Figure 5:
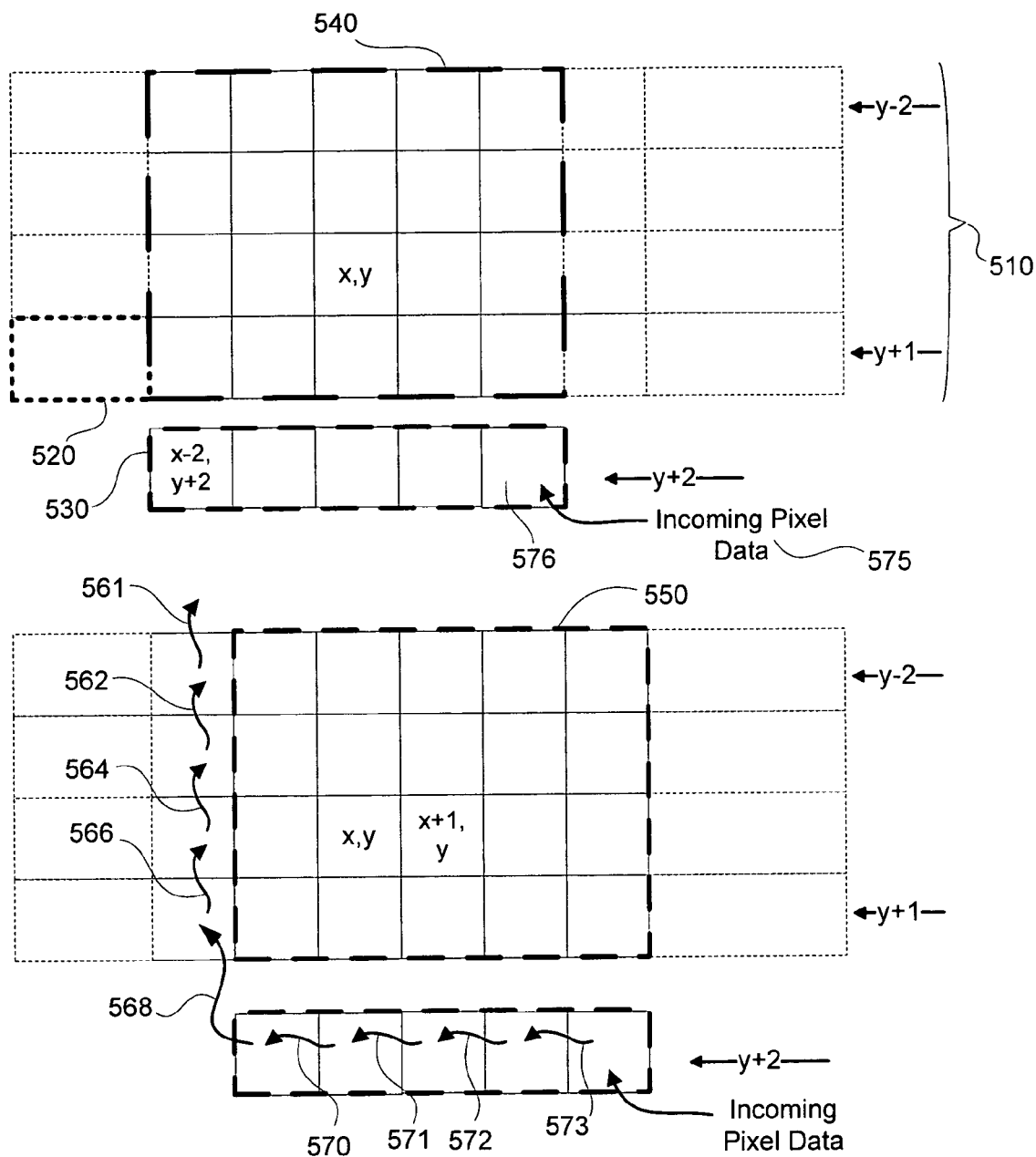
FIG. 5 illustrates the movement of pixel data in line buffers of an embodiment.

Another aspect of the invention is that the method and system are operable in a relatively small amount of memory. A buffer memory for storing pixel data to evaluate terms according to the methods of FIGS. 1 and 4 is illustrated in FIG. 5. According to this embodiment, a relatively small line buffer 510 including memory for storing 4 lines of pixel memory and a small number of word registers are sufficient storage for implementing the sharpness detector 120, predictor 130 and decision maker 140 illustrated in FIG. 1.

In an embodiment, the computational operations to evaluate the subframe sums $s_{ij}$ include accumulating the convolution terms $g(x,y)$ as taught above. In the embodiment the terms are evaluated using the convolution matrix coefficients (shown in FIG. 3), five columns of four consecutive lines (rows) of the current image subframe data 540 (FIG. 5), and a five column portion 530 (FIG. 5) comprising the image data of the current line most recently received from the image sensor.

FIG. 5 also illustrates pixel data movement when evaluating the convolution. An incoming pixel value 575, from a current line (the row being processed) of the current subframe, is received from the image sensor and stored in a rightmost cell 576 of a short logical five register buffer 530. Four other incoming pixel data of that line are stored adjacently in the register buffer, in order of being read in (least recent to the left, most recent going right). Apart from row segment portion 520, the consecutive lines (rows) of image data received before the incoming line of the subframe, corresponding to the rows designated by the indices y−2 through y+1 (e.g. in correspondence with n=−2 through n=1 of the convolution terms) have been retained in the four line buffer 510. As will become apparent, row segment 520 comprises columns of the current line (row) of data that were received from the image sensor into the five column pixel data register buffer 530.

The pixel data in "window" 540 of the line buffers 510 and the short five column register buffer 530 are sufficient for evaluating one term of the convolution sum. The evaluation is by multiplying the elements of the 5×5 mask $w(m,n)$ of FIG. 3 with corresponding values $f(x+m, y+n)$ stored in the dashed areas including five columns of the line buffers 540 and five column register buffer 530, and adding the signed products into an accumulation register thereby accumulating the 25 terms comprising $g(x,y)$. This evaluation requires only: the 6 distinguishable coefficients of the matrix in FIG. 3 (the matrix has 4-fold symmetry), the five columns 540 of the pixel data from 4 consecutive lines of buffered image data, and the five corresponding columns of pixels most recently received pixel data from the image sensor in buffer register 530. After the term $g(x,y)$ has been evaluated, its absolute value is formed and the absolute value of $g(x,y)$ accumulated into a register comprising a partial sum of the numerator of $s_{ij}$.

After evaluating $g(x,y)$, the window of the line buffers and the most recently received pixel data are advanced to the right by one column to the position 550 as shown in the lower portion of FIG. 5. The oldest datum at [x−2,y−2] in window 540 of the top half of the figure is no longer needed for term evaluations. It is overwritten by the datum at [x−2,y−1] (e.g. effectively discarded as depicted by arrow 561 and replaced by the data from the position below as depicted by arrow 562). Accordingly, each of the data in column x−2 of the four line buffer 510 is shifted up one row as depicted by the arrows 562, 564, and 566: the datum at [x−2,y−1] is moved to position [x−2,y−2] 562, the datum at [x−2,y] is moved to position

[x−2,y−1], the datum at [x−2,y+1] is moved to [x−1,y] 564, and the oldest pixel data [x−2,y+2] in leftmost position of the five column line buffer register as shown in 530, is transferred into position [x−2,y+1] of the 4 line data buffer, depicted by arrow 568. Next, the other values in the five column incoming pixel data buffer register 530 are left shifted by one column as depicted schematically by arrows 570, 571, 572, 573.

The next pixel datum received from the image sensor is then read into the rightmost column of buffer register 530. The next term, g(x+1,y) can then be evaluated as described for g(x,y) above. The process of evaluating a term of the convolution sum, shifting the pixel data positions, and advancing the window right one column is repeated until all of the terms in the row y of $s_{ij}$ have been accumulated. The window position is then restarted at the left and terms of the next row, row y+1, are evaluated and accumulated in the same way. The sum $s_{ij}$ is complete when all rows of subframe i have been processed.

However, evaluating g(x,y) in the two rows or two columns bordering the edge of a subframe requires data beyond the perimeter of the subframe (formally, the convolution sum for [x,y] requires data from two adjacent rows and column in each direction). In various embodiments, these edge values can be estimated by standard techniques for a boundary (e.g. extrapolation, mirroring, assuming the value of the first available row, truncation, etc.). In the instant embodiment, filtering is limited to the reduced subframe [W−2×H−2] so that physical row and column data from the image sensor are available to evaluate the terms. Of course the numbering of the indices and constants for boundary values are adjusted accordingly using standard techniques. Also, it will be understood that describing the movement of data in terms of "left" and "right," "above" and "below," or as rows and column, is only by way of explanation. In various embodiments these terms may be interchanged, or other terms may be used. While these terms are convenient for referencing the logical data structure, physical storage locations of the media are often mapped in various ways, depending on the application.

It is seen that a line buffer for a relatively small number of lines and a small number of storage registers are sufficient for implementing the predictor 130 and decision maker 140. In an embodiment comprising four subframes, four sharpness values $s_{ij}$ characterize motion in the $j^{th}$ frame. The predictor in the embodiment depends on $D_{max}, D_{3j}, D_{4j}, k_1$, and $k_2$. The decision maker 140 depends on $S_j, S_c$, predictor output, and the selected maximum number of frames. Hence the predictor and decision maker can be implemented using about 15 register cells for storing constants and values characteristic of the motion. Of course, depending on the application, other filtering methods and/or different filters may be used within the scope and spirit of the invention, including filter convolution matrices that are larger or smaller than the illustrative 5×5 matrix. In one embodiment according to the illustrative example, the number of line buffers operable to evaluate image sharpness (four line buffers in the embodiment of FIG. 5) is one less than the dimensionality of the convolution matrix (5 in the matrix embodiment of FIG. 3). In addition, a small register buffer is required for storing a number of pixel data, the number being equal to the dimensionality of the filtering matrix. Hence embodiments of the method and system have advantageously small buffer and register requirements, thereby reducing cost.

Figure 6:
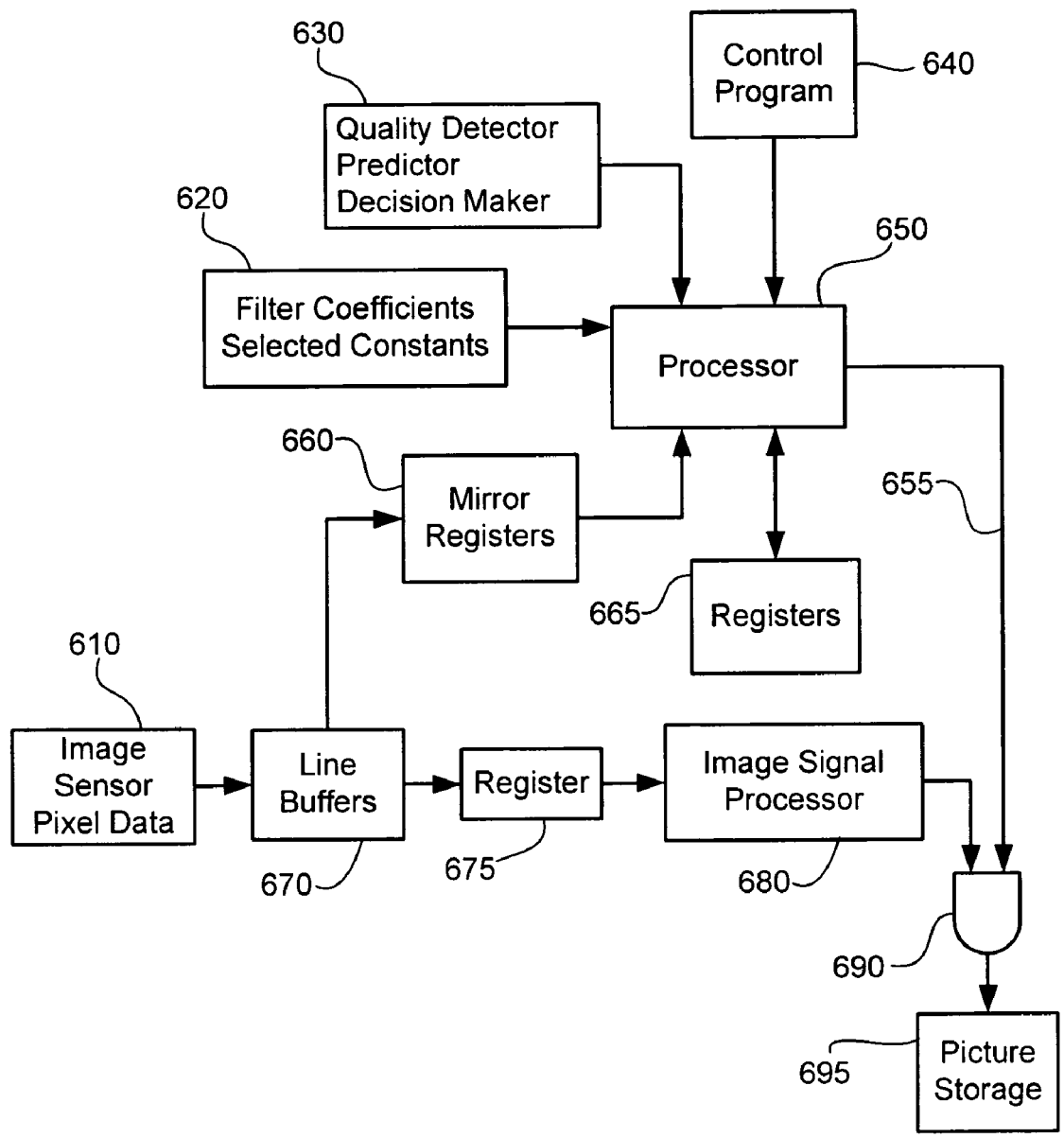
FIG. 6 is a flow diagram showing data flow of an embodiment for improved image capture.

FIG. 6 illustrates simplified aspects of data flow in a digital camera embodiment of the invention. The camera has a processor 650. The camera also has machine readable media including storage for instructions and data operable by the processor to implement a control program 640, instructions to implement a quality detector, predictor and decision maker 630, data storage for filter coefficients to implement a high frequency sharpness filter 620, data storage for selected constants to implement other functions including the quality detector, predictor and decision maker, and data storage registers for storing and receiving values and results by the processor. Also, the camera has an image sensor. Responsive to an image, the image sensor sequentially sends image sensor pixel data 610 comprising lines of image sensor pixels to line buffers 670. In the embodiment, the processor 650 has no direct access to the data in line buffers 670. Control circuitry automatically mirrors a portion of the line buffers 670 into mirror registers 660. The mirror registers 660 are interrogated by the processor. The mirrored data portion 660 includes the matrix of the pixel data, including the data in storage 540 and 530 for evaluating $s_{ij}$ as described in connection with FIG. 5.

The camera also includes an image signal processor (ISP) 680 for processing pixel data 610 from a register 675 of the media, and transforming the pixel data into another form, such as compressed Joint Photographic Experts Group form (JPEG), for capturing and storing in a picture storage media 695. The image sensor data is independently pipelined by control circuits from the image sensor into the line buffers 670, the register 675 and the ISP.

In one embodiment, the control program in media 640 directs operation and data flow between the program modules of the quality detector, predictor and decision maker according to the method of FIG. 4. The processor performs the quality detector, accessing filter matrix coefficients and constants stored in media 620, and saves results in register media 665. Selected constants of the predictor and decision maker are also in media 620. The evaluated quantities based on the image data (e.g. $g(x,y), s_{ij}, D_{max}$ etc.), on the other hand, are saved into and accessed from register media 665. When the decision maker decides to capture a next image, it outputs a capture signal on signal line 665 to gating control circuitry 690. The gating control 690 captures a next image from the ISP into the picture storage 695 if and only the decision maker outputs the capture signal.

While the quality detector, predictor and decision maker are implemented by a processor operable to perform program code in the embodiment, in other embodiments various of these functions or all of these functions are implemented using control circuitry. Also, although the mirror registers 660 and quality detector in 630 of the embodiment detect image quality based on high a 5×5 matrix high pass filtering of the image data, in various other embodiments a quality detector is implemented based on wavelet transforms, or various other methods adapted to detect sharpness, depending on the application.

Figure 7:
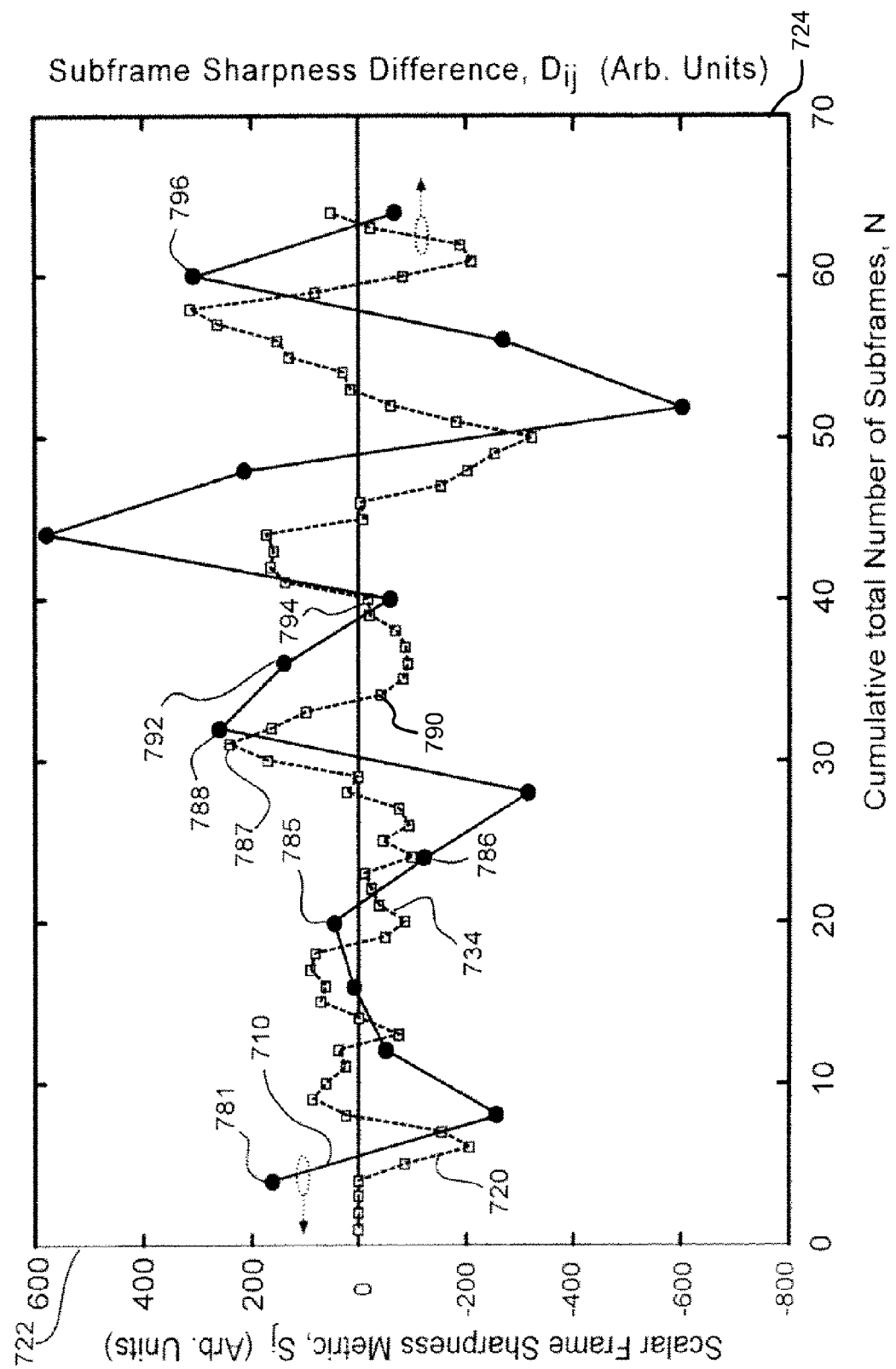
FIG. 7 is a graph illustrating improved image capture of an embodiment.

FIG. 7 is a graph showing the evolution of frame sharpness $S_j$ (solid line 710), and successive differences between the current and previous subframe sharpness $D_{ij}=s_{ij}-s_{ij-1}$, (dashed line 720) during picture taking with an embodiment of an anti-shake camera. The left hand vertical axis 722 for $S_j$ and the right hand vertical axis 724 for $D_{ij}$ are marked in arbitrary units. Horizontal axis units are the total number of subframes, N, that have been evaluated since a starting time corresponding to N=0. After the camera is placed into a state preparatory to capturing an image, it begins to evaluate subframes. The line graphs of $S_j$ and $D_{ij}$ are drawn starting at N=4 (frame 1). N=4 is the subframe where the sharpness of the first image frame 781 consisting of the four subframes numbered 1 through 4 is evaluated. The sharpness 781 of image frame 1 is about 167 units. The illustrative camera in the embodiment corresponding to FIG. 7 has a preset frame timeout parameter of 10 frames.

As shown in FIG. 7, after the evaluation of image frame 1 four more image frames are read and evaluated. A capture command is received just after processing the $20^{th}$ subframe 734. The $20^{th}$ subframe corresponds to a fifth complete image frame starting from the beginning of the graph at N=0. Therefore image frame 6, corresponding to the point 786, is the first image frame that is evaluated after receiving the capture command. Also, the $10^{th}$ image frame after the capture command is image frame 15 at 796 in FIG. 7. This is the image frame where the timeout maximum of 10 frames after the capture command is reached. Therefore the decision maker will not make a decision to capture based on a timeout override until after image frame 14 (subframe 56 at 738) has been evaluated.

After the capture command is received (N=20 in this example), there is increasing motion which is manifest by the negative sharpness value differences $D_{ij}$ found in subframes 21 through 24. Responsive to the increased motion, the sharpness of the next complete frame after receiving the capture command at N=24 (frame 6) 786 is diminished relative to frame 5. The sharpness of this first image frame following the capture instruction, referenced by the decision maker as $S_c=S_6$ in the formulae above, has a value $S_6 \approx -127$. Motion continues to increase during the next 3 subframes, 25-27 as evidenced by negative $D_{ij}$ ($D_{ij}<0$). At subframe 28 there is a small improvement (less motion, $D_{ij}>0$), but the increased motion during subframes 25-27 outweighs the relatively small improvement at subframe 28. Hence at subframe 28 the metric of motion $S_{c+1}$ ($S_7$), which is comprised of contributions from the four subframes N=25-28, has worsened relative to $S_6$ ($S_c$), decreasing from $S_6 \approx -127$ to $S_7 \approx -318(S_{c+1})$. Since $S_{c+1} \approx -318 < S_c \approx -127$, the decision maker does not capture.

At subframe 29 the level of motion is relatively stable ($D_{ij}=0$) and starting at subframe 30 the level of motion significantly diminishes. The subframe sharpness continuously improves ($D_{ij}>0$) from subframe 30 through subframe 32. This results in substantially increased sharpness of frame $S_8=S_{c+2}=788$ which reaches a local maximum of about 240. Although $S_8>S_c$ at this frame, the rate of sharpness improvement between the last successive subframes of frame 8 has decreased ($D_{4j}<D_{3j}$, j=8). Therefore the next image motion is not predicted to improve (since neither Proposition 1 nor Proposition 2 are true) and the decision maker does not decide to capture the next image frame.

Starting at subframe 34, 790, motion increases again ($D_{ij}<0$) resulting in renewed deterioration of the frame sharpness. At frame 9, 792, the rate of sharpness improvement between the last two successive subframes of a frame has decreased again, e.g. an increased rate of sharpness deterioration, ($D_{4j}<D_{3j}<0$, j=9). Therefore the decision maker does not decide to capture a next frame. However after frame 9 (subframe 36) the rate of deterioration eases, as evidenced by $D_{ij}$ increasing monotonically from subframe 36 of frame 10 (793) through subframe 40 of frame 10 (794).

When frame 10 is evaluated (subframe 40 at 794), the predictor predicts that next image frame motion will be less than the current image frame motion because Proposition 2 is true. This is apparent from the following considerations. $D_{4j}>D_{3j}$, (j=10) as required by the last term of both Proposition 1 and Proposition 2. Next, it is seen that $D_{4j}<0$ at frame 10 (subframe 40). Therefore Proposition 1 is false and it remains to evaluate the second term of Proposition 2 for deciding whether next image motion is predicted to be less than current image frame motion. $|D_{ij}|<k_2*D_{max}$ ($k_2=\frac{1}{2}$), $D_{max}$ is first determined by selecting the maximum value of $|D_{ij}|$ found in the interval that begins after the capture command at frame 20 and ends after the subframes of frame 40. It is seen that $|D_{ij}|$ reaches a relative maximum value in this interval at subframe 31 (787) where $D_{ij} \approx 240$. At frame 10, (subframe 40) $D_{4j}$ is about $-18$ units. Therefore inequality: $D_{4,10}-18<k_2*D_{max} \approx \frac{1}{2}*240=120$ is satisfied at frame 10. Hence, at frame 10 the Proposition 2 is true and the predictor predicts that the next image motion will be less than the current image frame motion.

Furthermore, at frame 10 (subframe 40), decision maker criteria to capture the next image frame are met because: 1) a capture command was received, 2) increasing sharpness is predicted by the predictor, and 3) the frame sharpness of frame 10 is greater than $S_c$: $S_{10} \approx -54 > S_c = S_6 \approx -127$. Following the decision to capture at frame 10, the next frame 796, frame 11 at subframe 44, is captured and stored in the image memory. Computed values of $D_{ij}$ and the sharpness of some successive subframes following the illustrative captured frame are also included FIG. 7 for comparison. It is seen that frame 11 is characterized by greater sharpness than any of the preceding or succeeding frames. Hence in this illustrative example, the inventive method captured the frame having the greatest sharpness during the time period shown (70 frames comprising about 2.3 sec., e.g. 30 frames per sec.).

Figure 8:
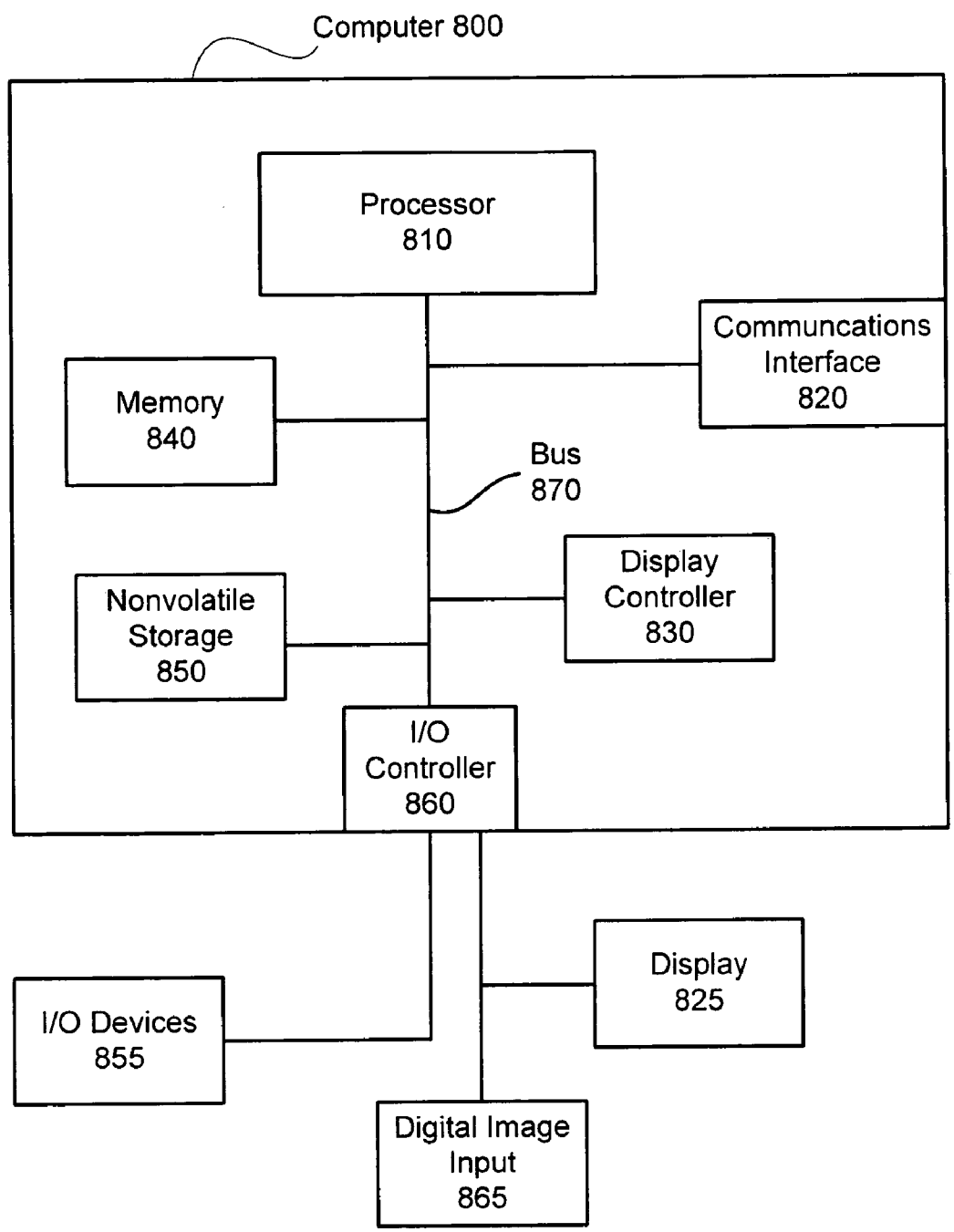
FIG. 8 illustrates an embodiment of a digital camera.

FIG. 8 shows one example of a personal device that can be used as a digital camera or similar device. Such a device can be used to perform many functions, depending on implementation, such as telephone communications, two-way pager communications, personal organizing, global positioning system, or similar functions. The computer system 800 represents the computer portion of the device comprising a digital camera. The computer 800 interfaces to external systems through the communications interface 820. This interface is typically some form of cable and/or wireless interface for use with an immediately available personal computer, and may include a radio interface for communication with a network such as an 802.11 wireless network. Of course various networks and communication methods such as a Bluetooth, an infrared optical interface, a cellular telephone interface and others, depending on the application.

The computer system 800 includes a processor 810, which can be a conventional microprocessor such as an Intel Pentium microprocessor, an IBM power PC microprocessor, a Texas Instruments digital signal processor, or some combination of various types of processors, depending on the embodiment. Memory 840 is coupled to the processor 810 by a bus 870. Memory 840 can be dynamic random access memory (DRAM) and can also include static ram (SRAM), flash memory, magnetic memory (MRAM) and other types, depending on the application. The bus 870 couples the processor 810 to the memory 840, also to non-volatile storage 850, to display controller 830, and to the input/output (I/O) controller 860. In some embodiments, various combinations of these components are integrated in a single integrated circuit or in a combination of integrated circuits that are combined into a single package. Note that the display controller 830 and I/O controller 860 are often be integrated together, and the display may also provide input.

The display controller 830 controls in the conventional manner of a display controller on a display device 825 which typically is a liquid crystal display (LCD) or similar flat-panel, small form factor display. The input/output devices 855 can include a keyboard, or stylus and touch-screen, and may sometimes be extended to include disk drives, printers, a scanner, and other input and output devices, including a mouse or other pointing device, such as when a camera is connected to some form of docking station or personal computer. The display controller 830 and the I/O controller 860 can be implemented with conventional well known technology. A digital image input device 865 can be a digital camera comprising an embodiment of the invention which is coupled to an I/O controller 860 or through a separate coupling in order to allow images to be input into the device 800.

The non-volatile storage 850 is often a FLASH memory or read-only memory, or some combination of the two. A magnetic hard disk, an optical disk, or another form of storage for large amounts of data may also be used in some embodiments, though the form factors for such devices typically preclude installation as a permanent component of the device 800. Rather, a mass storage device on another computer is typically used in conjunction with the more limited storage of the device 800. Some of this data is often written, by a direct memory access process, into memory 840 during execution of software in the device 800. One of skill in the art will immediately recognize that the terms "machine-readable medium" or "computer-readable medium" include any type of storage device that is accessible by the processor 810 and also encompasses a carrier wave that encodes a data signal.

The device 800 is one example of many possible devices which have different architectures. For example, devices based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to differing bus protocols.

In addition, the device 800 is controlled by operating system software which may include a file management system, such as a disk operating system, which is part of the operating system software. One example of an operating system with its associated file management system software is the family of operating systems known as Windows CE® from Microsoft Corporation of Redmond, Wash., and their associated file management systems. Another example of an operating system with its associated file management system software is the Palm® operating system and its associated file management system. However, it is common for digital cameras to have much less developed file management software and associated user interfaces. The file management system is typically stored in the non-volatile storage 850 and causes the processor 810 to execute the various acts required by the operating system to input and output data and to store data in memory, including storing files on the non-volatile storage 850. Other operating systems may be provided by makers of devices, and those operating systems typically will have device-specific features which are not part of similar operating systems on similar devices. Similarly, WinCE® or Palm® operating systems may be adapted to specific devices for specific device capabilities.

Device 800 may be integrated onto a single chip or set of chips in some embodiments, and typically is fitted into a small form factor for use as a personal device. Thus, it is not uncommon for a processor, bus, onboard memory, and display-I/O controllers to all be integrated onto a single chip. Alternatively, functions may be split into several chips with point-to-point interconnection, causing the bus to be logically apparent but not physically obvious from inspection of either the actual device or related schematics.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "evaluating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. Thus the apparatus may be embodied in a medium.

One skilled in the art will appreciate that although specific examples and embodiments of the system and methods have been described for purposes of illustration, various modifications can be made without deviating from the spirit and scope of the present invention. For example, embodiments of the present invention may be applied to many different types of image acquisition systems, imaging devices, databases, application programs and other systems. Moreover, features of one embodiment may be incorporated into other embodiments, even where those features are not described together in a single embodiment within the present document. Accordingly, the invention is described by the appended claims.

We claim:

1. A method of capturing an image in a digital camera, comprising:

receiving a previous image input of a previous image frame and forming a sharpness value of the previous image input, wherein the previous image input is a subframe of the previous image frame and wherein the previous image frame is an image frame immediately preceding a current image frame;

receiving a current image input of the current image frame and forming a sharpness value of the current image input, wherein the current image input is a corresponding subframe of the current image frame;

predicting that a next image frame motion will be less than a current image frame motion, the prediction being based at least on the sharpness value of the previous image input, the sharpness value of the current image input, and on a difference between a sharpness value of the subframe of the current image frame and a sharpness value of the corresponding subframe of the previous image frame, wherein the subframe of the current image frame is a last subframe of the current image frame and an absolute value of the difference is less than a selected factor multiplied by a maximum of absolute values of other consecutive sharpness value differences;

deciding to capture a next image frame responsive to the prediction; and capturing the next image frame.

2. The method of claim 1 further comprising receiving a capture command, wherein the receiving of the previous image input of a previous image frame is after receiving the capture command.

3. The method of claim 1 further comprising receiving a first image input of a first image frame and forming a sharpness value of the first image input, wherein the first image frame is different from the previous image frame, and the receiving of the first image input is before the receiving of the previous image input.

4. The method of claim 3 further comprising receiving a capture command, wherein the receiving of the first image input is before the receiving of the capture command and the receiving of the previous image input is after the receiving of the capture command.

5. The method of claim 3 wherein the first image input is a subframe of the first image frame, the previous image input is a subframe of the previous image frame, and the current image input is a subframe of the current image frame.

6. The method of claim 3 wherein forming a sharpness value comprises a high frequency extracting filter.

7. The method of claim 3 wherein the high frequency extracting filter is a high pass filter.

8. The method of claim 1 wherein forming a sharpness value of an image input selected from the previous image input and the current image input comprises a sum of convolving a high pass filter matrix with the image input.

9. The method of claim 8 wherein the high pass filter matrix has a symmetry.

10. The method of claim 1, wherein deciding to capture the next image frame depends on having a frame sharpness of the current image frame that is greater than the frame sharpness of the previous image frame.

11. The method of claim 1, wherein deciding to capture the next image frame depends on having a frame sharpness of the current image frame that is greater than the frame sharpness of any image frame after the capture command.

12. A method of capturing an image in a digital camera, comprising:
    receiving a previous image input of a previous image frame and forming a sharpness value of the previous image input, wherein the previous image input is a subframe of the previous image frame and wherein the previous image frame is an image frame immediately preceding a current image frame;
    receiving a current image input of the current image frame and forming a sharpness value of the current image input, wherein the current image input is a corresponding subframe of the current image frame;
    predicting that a next image frame motion will be less than a current image frame motion, the prediction being based at least on the sharpness value of the previous image input, the sharpness value of the current image input, and on a difference between a sharpness value of the subframe of the current image frame and a sharpness value of the corresponding subframe of the previous image frame, wherein the subframe of the current image frame is a last subframe of the current image frame and an absolute value of the difference is less than a selected factor multiplied by a maximum of absolute values of other consecutive sharpness value differences, and wherein the selected factor depends on the sign of the difference and the selected factor is less than 1;
    deciding to capture a next image frame responsive to the prediction; and
    capturing the next image frame.

13. A method of capturing an image in a digital camera, comprising:
    receiving a previous image input of a previous image frame and forming a sharpness value of the previous image input, wherein the previous image input is a subframe of the previous image frame and wherein the previous image frame is an image frame immediately preceding a current image frame;
    receiving a current image input of the current image frame and forming a sharpness value of the current image input, wherein the current image input is a corresponding subframe of the current image frame;
    predicting that a next image frame motion will be less than a current image frame motion, the prediction being based at least on the sharpness value of the previous image input, the sharpness value of the current image input, and on a difference between a sharpness value of the subframe of the current image frame and a sharpness value of the corresponding subframe of the previous image frame, wherein the subframe of the current image frame is a last subframe of the current image frame;
    deciding to capture a next image frame responsive to the prediction; and
    capturing the next image frame.

14. A method of capturing an image in a digital camera, comprising:
    receiving a previous image input of a previous image frame and forming a sharpness value of the previous image input, wherein the previous image input is a subframe of the previous image frame and wherein the previous image frame is an image frame immediately preceding a current image frame;
    receiving a current image input of the current image frame and forming a sharpness value of the current image input, wherein the current image input is a corresponding subframe of the current image frame;
    predicting that a next image frame motion will be less than a current image frame motion, the prediction being based at least on the sharpness value of the previous image input, the sharpness value of the current image input, and on a difference between a sharpness value of the subframe of the current image frame and a sharpness value of the corresponding subframe of the previous image frame, wherein an absolute value of the difference is less than a selected factor multiplied by a maximum of absolute values of other consecutive sharpness value differences;
    deciding to capture a next image frame responsive to the prediction; and
    capturing the next image frame.

15. An apparatus comprising:
a digital image sensor operable to output data associated with an image;
machine readable media coupled to the digital image sensor and operable to store data and instructions;
at least one processor coupled to the machine-readable media and operable to perform the instructions and operate on the data, wherein when performed the instructions are operable on the data to:
    receive a previous image input of a previous image frame and forming a sharpness value of the previous image input, wherein the previous image input is a subframe of the previous image frame and wherein the previous image frame is an image frame immediately preceding a current image frame;
    receive a current image input of the current image frame and forming a sharpness value of the current image input, wherein the current image input is a corresponding subframe of the current image frame;

predict that a next image frame motion will be less than a current image frame motion, the prediction being based at least on the sharpness value of the previous image input, the sharpness value of the current image input, and on a difference between a sharpness value of the subframe of the current image frame and a sharpness value of the corresponding subframe of the previous image frame, wherein the subframe of the current image frame is a last subframe of the current image frame and an absolute value of the difference is less than a selected factor multiplied by a maximum of absolute values of other consecutive sharpness value differences;

decide to capture a next image frame responsive to the prediction; and capture the next image frame.

16. The apparatus of claim 15 wherein the machine readable media comprises a line buffer for a relatively small number of lines.

17. The apparatus of claim 15 wherein sharpness is determined using convolution of a high pass filter matrix with the data associated with an image.

18. An apparatus comprising:

a digital image sensor operable to output data associated with an image;

machine readable media coupled to the digital image sensor and operable to store data and instructions;

at least one processor coupled to the machine-readable media and operable to perform the instructions and operate on the data, wherein when performed the instructions are operable on the data to:

receive a previous image input of a previous image frame and forming a sharpness value of the previous image input, wherein the previous image input is a subframe of the previous image frame and wherein the previous image frame is an image frame immediately preceding a current image frame;

receive a current image input of the current image frame and forming a sharpness value of the current image input, wherein the current image input is a corresponding subframe of the current image frame;

predict that a next image frame motion will be less than a current image frame motion, the prediction being based at least on the sharpness value of the previous image input, the sharpness value of the current image input, and on a difference between a sharpness value of the subframe of the current image frame and a sharpness value of the corresponding subframe of the previous image frame wherein the subframe of the current image frame is a last subframe of the current image frame and an absolute value of the difference is less than a selected factor multiplied by a maximum of absolute values of other consecutive sharpness value differences, and wherein the selected factor depends on the sign of the difference and the selected factor is less than 1;

decide to capture a next image frame responsive to the prediction; and capture the next image frame.

19. The apparatus of claim 18 wherein the machine readable media comprises a line buffer for a relatively small number of lines.

20. The apparatus of claim 18 wherein sharpness is determined using convolution of a high pass filter matrix with the data associated with an image.

21. An apparatus comprising:

a digital image sensor operable to output data associated with an image;

machine readable media coupled to the digital image sensor and operable to store data and instructions;

at least one processor coupled to the machine-readable media and operable to perform the instructions and operate on the data, wherein when performed the instructions are operable on the data to:

receive a previous image input of a previous image frame and forming a sharpness value of the previous image input, wherein the previous image input is a subframe of the previous image frame and wherein the previous image frame is an image frame immediately preceding a current image frame;

receive a current image input of the current image frame and forming a sharpness value of the current image input, wherein the current image input is a corresponding subframe of the current image frame;

predict that a next image frame motion will be less than a current image frame motion, the prediction being based at least on the sharpness value of the previous image input, the sharpness value of the current image input, and on a difference between a sharpness value of the subframe of the current image frame and a sharpness value of the corresponding subframe of the previous image frame wherein the subframe of the current image frame is a last subframe of the current image frame;

decide to capture a next image frame responsive to the prediction; and capture the next image frame.

22. The apparatus of claim 21 wherein the machine readable media comprises a line buffer for a relatively small number of lines.

23. The apparatus of claim 21 wherein sharpness is determined using convolution of a high pass filter matrix with the data associated with an image.

24. An apparatus comprising:

a digital image sensor operable to output data associated with an image;

machine readable media coupled to the digital image sensor and operable to store data and instructions;

at least one processor coupled to the machine-readable media and operable to perform the instructions and operate on the data, wherein when performed the instructions are operable on the data to:

receive a previous image input of a previous image frame and forming a sharpness value of the previous image input, wherein the previous image input is a subframe of the previous image frame and wherein the previous image frame is an image frame immediately preceding a current image frame;

receive a current image input of the current image frame and forming a sharpness value of the current image input, wherein the current image input is a corresponding subframe of the current image frame;

predict that a next image frame motion will be less than a current image frame motion, the prediction being based at least on the sharpness value of the previous image input, the sharpness value of the current image input, and on a difference between a sharpness value of the subframe of the current image frame and a sharpness value of the corresponding subframe of the previous image frame, wherein an absolute value of the difference is less than a selected factor multiplied by a maximum of absolute values of other consecutive sharpness value differences;

decide to capture a next image frame responsive to the prediction; and capture the next image frame.

25. The apparatus of claim 24 wherein the machine readable media comprises a line buffer for a relatively small number of lines.

26. The apparatus of claim 24 wherein sharpness is determined using convolution of a high pass filter matrix with the data associated with an image.

* * * * *

UNITED STATES PATENT AND TRADEMARK OFFICE
CERTIFICATE OF CORRECTION

PATENT NO. : 7,593,040 B2   Page 1 of 1
APPLICATION NO. : 11/395282
DATED : September 22, 2009
INVENTOR(S) : Shan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 706 days.

Signed and Sealed this

Twenty-first Day of September, 2010

David J. Kappos
*Director of the United States Patent and Trademark Office*